(12) United States Patent
Phillips

(10) Patent No.: US 6,507,811 B1
(45) Date of Patent: Jan. 14, 2003

(54) METHOD FOR SYMBOL MANIPULATION IN AN ELECTRONIC DATA PROCESSING SYSTEM

(76) Inventor: Douglas E. Phillips, 9705 Hidden Valley Rd., Vienna, VA (US) 22181-6095

( * ) Notice: Subject to any disclaimer, the term of this patent is extended or adjusted under 35 U.S.C. 154(b) by 0 days.

(21) Appl. No.: 08/854,388

(22) Filed: May 12, 1997

(51) Int. Cl.[7] ............................................. G06F 17/27
(52) U.S. Cl. ...................................................... 704/1
(58) Field of Search ...................... 704/1, 4, 9; 434/171

(56) References Cited

U.S. PATENT DOCUMENTS

| | | | |
|---|---|---|---|
| 3,618,952 A | 11/1971 | Tallarida | 273/135 B |
| 3,660,913 A | 5/1972 | Heath | 35/30 |
| 3,732,632 A | 5/1973 | Dyer | 35/31 A |
| 3,770,192 A | 11/1973 | Tallarida | 235/88 |
| 3,851,409 A | 12/1974 | Teahan | 35/31 F |
| 4,724,523 A | * 2/1988 | Kucera | 704/9 |
| 4,773,039 A | * 9/1988 | Zamora | 704/9 |
| 4,864,501 A | * 9/1989 | Kucera et al. | 704/8 |
| 4,868,750 A | * 9/1989 | Kucera et al. | 704/8 |
| 4,914,019 A | * 4/1990 | Chu | 343/171 |
| 5,023,850 A | 6/1991 | Metts | 368/28 |
| 5,607,159 A | * 3/1997 | Bryson | 273/243 |

* cited by examiner

*Primary Examiner*—Patrick N. Edouard
(74) *Attorney, Agent, or Firm*—Covington & Burling

(57) ABSTRACT

This invention provides a method for symbol manipulation in an electronic data processing system that can be used to alter the representation of ages, names, and proverbs in ways that some people find to be highly amusing. Among other advantages, the representation of people's ages can be altered so that a younger person seems older and an older person seems younger, and the representation of people's names can be altered so that they appear to come from other cultures and are descriptive of the person. Similarly, the representation of proverbs can be altered so that they appear to concern matters of individualized interest. In a preferred embodiment, the method of the present invention comprises the steps, using an electronic data processing system, of inputting an expression of age in base 10 notation, converting the expression of age in base 10 notation to an expression of age in an alternate base notation, and outputting the expression of age in the alternate base notation. An alternate preferred embodiment of a method of the present invention comprises the steps, using an electronic data processing system, of inputting an input name and an input adjective, converting the input name to a cognate form, converting the input adjective to a synonym, and outputting the cognate form and the synonym. Another alternate preferred embodiment of a method of the present invention comprises the steps, using an electronic data processing system, of inputting an input phrase and an input adjective, selecting a proverb form corresponding to the input adjective, inserting the input phrase into the proverb form, and outputting the proverb form with the inserted input phrase.

10 Claims, 3 Drawing Sheets

METHOD FOR SYMBOL MANIPULATION IN AN ELECTRONIC DATA PROCESSING SYSTEM

BACKGROUND OF THE INVENTION

This invention relates to symbol manipulation in electronic data processing systems, and more particularly to methods for altering the representation of ages, names, and proverbs in electronic data processing systems.

DESCRIPTION OF THE RELEVANT ART

People have an intense interest in their personal characteristics. Since Gilgamesh of the Sumerian-Babylonian epic traveled to King Utnapishtim to learn the secret of eternal life, and especially in modern youth-oriented culture, concern about aging has inspired solutions both fictional (the "fountain of youth") and non-fictional (cosmetic surgery). Personal names are similarly important. As Dale Carnegie observed, a person's name is his or her favorite word. With perhaps somewhat less intensity, people are also interested in brief and witty commentary, often in the form of proverbs, on the future, their relationships with other people, and other familiar items.

Although people generally express their age and other numbers in base 10 notation, i.e., each digit has 10 potential values (0 through 9), it is common in certain fields for alternate base notations to be used. For example, computer hardware generally uses two different states to represent single units of information, and it is therefore generally convenient for computer scientists to represent numbers using base 2 notation (this binary system conventionally uses the symbols "0" and "1" to represent the two available states). Similarly, computer scientists sometimes represent numbers using base 8 (octal) and base 16 (hexadecimal) notations since these representations are more compact than base 2 notation and can be converted to base 2 notation without extensive calculations.

Although any symbol set with a sufficient number of distinct symbols can be used to express numbers using a specified base, it has been traditional to use all or portions of the normal base 10 symbol set, consisting of the numerals "0", "1", "2", "3", "4", "5", "6", "7", "8", and "9", in combination with letters of the alphabet to represent numbers in any base. For example, 10 (in base 10 notation) is expressed as the letter "A" in base 12 notation. A number expressed in a notation other than base 10 may, for example, consist only of symbols taken from the normal base 10 symbol set and thus can be mistakenly interpreted as a number expressed in base 10 notation. If, however, a number is expressed in a notation other than base 10 and contains letters of the alphabet, then it will be clear that the number, if it is recognized as a number at all, is not expressed in base 10 notation. Any number can, however, be converted from base 10 notation to some other base notation in which the number is still expressed only in symbols taken from the normal base 10 symbol set.

While an unlimited number of bases for numerical representation are available, most bases are not commonly used. Methods for converting between any two specified bases are, however, known to mathematicians.

Ages, of course, are conventionally expressed mathematically in base 10. Strangely, people are frequently dissatisfied with their age. Relatively small age numbers are often taken to represent a lack of experience and maturity. On the other hand, relatively large age numbers are often taken to represent feebleness, mental inflexibility, and other undesirable characteristics. Thus, the young wish to acquire larger age numbers while the old wish to acquire smaller age numbers.

Just as numbers may be represented by a variety of notations, personal names can also be expressed by multiple notations. This commonly occurs in translating names into foreign languages. Other possible notations for names are also available. The most commonly used names are not new creations. They typically have rich histories of use, often dating back to the Hebrew Bible or Ancient Greece. As a result, there exist various cognates for current names drawn from around the world through recorded history. Further, a common naming practice in many cultures (referred to here as "descriptive naming") has been to append to the given name an adjective, such as "the Great," "the Red," or "the Berserk," that describes the person.

People in many modern cultures generally have given names that are selected from a relatively small pool of choices. Some of these people wish to experience unfamiliar and perhaps more descriptive names.

Many people also enjoy the succinct wit and wisdom of proverbs. The proverbs created and published by historical figures such as Benjamin Franklin are well known, as are numerous anonymous proverbs and related fortune cookie sayings. Unfortunately, proverbs are generally related to matters of general interest rather than tailored to the particular interests of individuals. It would be amusing to some people if proverbs could comment on matters of individualized interest.

Numerical and textual information can be represented in many ways. Computers, by way of example, use voltage levels, changes in magnetic flux, and other means to represent information. Many methods are known for converting between forms of representation while retaining the meaning of the underlying numerical or textual information. By way of example, the base 10 number "2" may be represented as the physical digit "2", the physical digits "10" in base 2 notations, or as a sequence of voltage levels which represent the digits "10" in base 2 notations. Regardless of the form of representation, however, the base 10 number "2" is generally thought to be meaningless outside of some known context. For example, "2" may refer to the number of floors in a building, the number of people in a room, the number of pencils in a desk drawer, and so forth.

Some forms of representation hold special significance for people and may become psychologically detached from the underlying object of the representation. In other words, the context in which the representation exists is ignored. A common example of this phenomenon is age. To illustrate, the nominal lifespan for dogs is sometimes taken to be approximately 11 years, while the nominal lifespan for humans is sometimes taken to be approximately 77 years. This leads to the relation that seven "dog years" pass in the span of one human or calendar year. Thus, it is sometimes said that a five year old dog is actually 35 years old. That the "35 years" refers to artificial "dog years" is ignored and the dog is regarded as if it should behave, in some sense, as if it were a 35 (calendar) year old human. A clock for keeping time at an animal's rate was taught in U.S. Pat. No. 5,023,850, entitled "Clock for Keeping Time at a Rate Other Than Human Time" and issued Jun. 11, 1991 to Metts et al.

In some areas, for example with regard to age, personal names, and common proverbs, it has not generally been recognized that the human ability to focus on representation while ignoring context can be manipulated in an electronic data processing system to produce constructs that some people find highly amusing.

SUMMARY OF THE INVENTION

An object of the invention is to provide a method of symbol manipulation in an electronic data processing system that alters the representation of age by converting an expression of age in base 10 notation to an expression of age in an alternate base notation.

An object of the invention is to provide a method of symbol manipulation in an electronic data processing system that alters the representation of a name by converting a name and an adjective associated with the name to a cognate form of the name and a synonym of the adjective.

An object of the invention is to provide a method of symbol manipulation in an electronic data processing system that alters the representation of proverbs by producing a proverb from a phrase and an adjective.

A preferred embodiment of a method of the present invention, as broadly described herein, comprises the steps of inputting an expression of age in base 10 notation into an electronic data processing system, using the electronic data processing system to convert the expression of age in base 10 notation to an expression of age in an alternate base notation, and outputting the expression of age in the alternate base notation.

An alternate preferred embodiment of a method of the present invention, as broadly described herein, comprises the steps of inputting an input name and an input adjective into an electronic data processing system, using the electronic processing system to convert the input name to a cognate form; using the electronic data processing system to convert the input adjective to a synonym; and outputting the cognate form and the synonym.

An alternate preferred embodiment of a method of the present invention, as broadly described herein, comprises the steps of inputting an input phrase and an input adjective into an electronic data processing system, using the electronic data processing system to select a proverb form corresponding to the input adjective, using the electronic data processing system to insert the input phrase into the proverb form, and outputting the proverb form with the inserted input phrase.

Additional objects and advantages of the invention are set forth in part in the description that follows, and in part are obvious from the description, or may be learned by practice of the invention. The objects and advantages of the invention may also be realized and attained by means of the steps, instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings.

Figure 1:
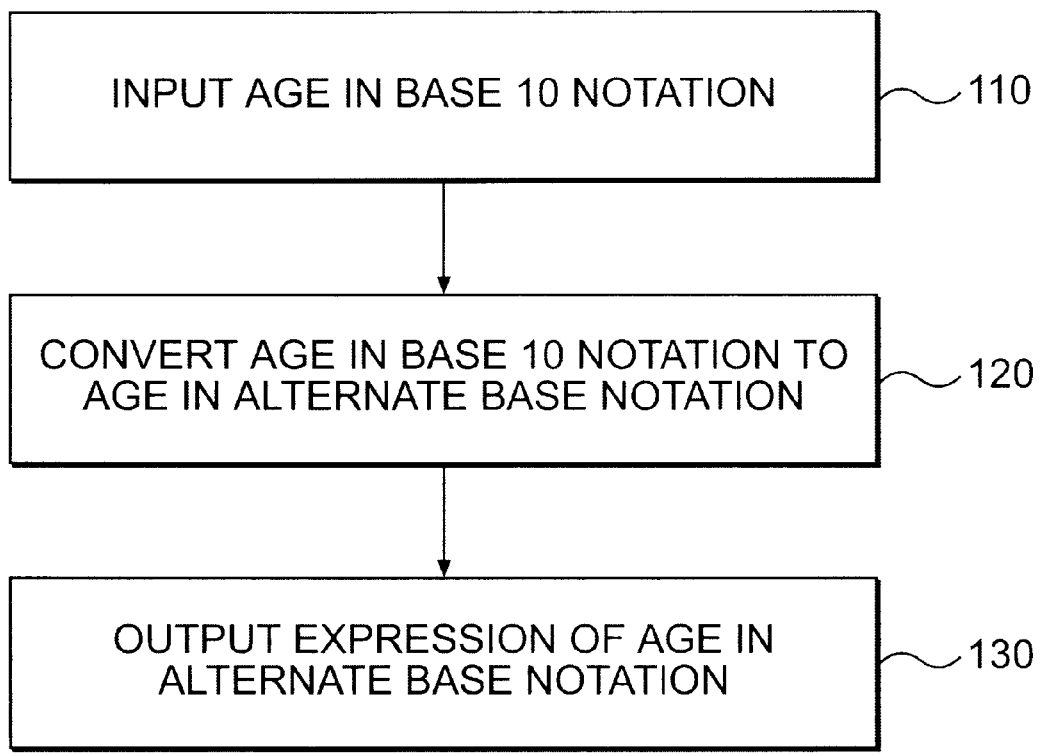
FIG. 1 is a flow chart depicting a preferred embodiment of a method for symbol manipulation in an electronic data processing system of the preferred invention, relating to the representation of age.

FIG. 1 depicts a flow chart of a preferred embodiment of a method for symbol manipulation in an electronic data processing system, relating to the representation of age. The method includes the steps, using an electronic data processing system, of inputting an expression of age in base 10 notation; converting the expression of age in base 10 notation to an expression of age in an alternate base notation; and outputting the expression of age in the alternate base notation. In a preferred embodiment, the electronic data processing system is the Internet network, including computer systems attached thereto. In alternative preferred embodiments, the electronic data processing system may be a personal computer, a communications network including the computer systems attached thereto, or other electronic data processing systems as are known in the art.

In the preferred embodiment depicted in FIG. 1, the inputting an expression of age step is accomplished by input age in base 10 notation step 110. In preferred embodiments, various input mechanisms as are known in the art, such as computer keyboards, electronic mice, and touchscreens, may be employed by a user for inputting the age information required by input age in base 10 notation step 110 into an electronic data processing system. In a preferred embodiment, the electronic data processing system is the Internet communications network including a computer systems attached thereto. In this preferred embodiment, information is, for example, input by a user at a home personal computer and is transmitted via World Wide Web protocols across the Internet to a web server where other steps of the method of the present invention may be performed. Other configurations and architecture of electronic data processing systems, as are known in the art, may be used.

In the preferred embodiment depicted in FIG. 1, the converting the expression of age step is accomplished by convert age in base 10 notation to age in alternate base notation step 120. Techniques for using electronic data processing systems to convert between base 10 notation and the notations for other bases are known in the art. In a preferred embodiment, this step is performed by a digital computer that forms a part of an electronic data processing system. In alternative preferred embodiments, this step may be performed by networked computers, analog computers or other computing systems as are known in the art that form portions of an electronic data processing system. In a preferred embodiment, the age in base 10 notation is used as an index to a table, as is known in the art, of pre-computed representations of the age in notations other than base 10 notation.

A number in a notation other than base 10 notation which is expressed only in symbols taken from the normal base 10 symbol has been found to have high amusement value to some persons. This is apparently because the number in a notation other than base 10 notation, when interpreted as it if were in base 10 notation, may appear to be larger or smaller than the number as expressed in base notation. For example, a person who is 41 years old in base 10 notation is only 29 years old in base 16 notation. Through this "age adjustment," the person seems to "lose" 12 years and can truthfully (by ignoring the speech convention of stating numbers in base 10 notation) claim to be a 29-year-old.

In a preferred embodiment, such as the preferred embodiment depicted in FIG. 1, an alternate base is selected for each number that represents an age in base 10 notation so that, as is known in the art, the expression of the age number in the alternate base notation, when interpreted as a expression of age in base 10 notation, is greater than the expression of the age number in base 10 notation. In this preferred embodiment, people appear to gain years of age. For example, a 2-year-old in base 10 notation becomes a 10-year-old in base 2 notation.

In a preferred embodiment, such as the preferred embodiment depicted in FIG. 1, an alternate base is selected for each number that represents an age in base 10 notation so that, as is known in the art, the expression of the age number in the alternate base notation, when interpreted as a expression of age in base 10 notation, is less than the expression of the age number in base 10 notation. In this preferred embodiment, people appear to lose years of age. For example, as described above, a 41-year-old in base 10 notation becomes a 29-year-old in base 16 notation.

In the preferred embodiment depicted in FIG. 1, the outputting the expression of age step is accomplished by output expression of age in alternate base notation step 130. In preferred embodiments, various output mechanisms as are known in the art, such as cathode-ray tube displays and printers, may be employed for outputting the age information required by output expression of age in alternate base notation step 130 by an electronic data processing system. In a preferred embodiment, the electronic data processing system is the Internet communications network including computer systems attached thereto. In this preferred embodiment, information is, for example, transmitted from a web server across the Internet via World Wide Web protocols to a home personal computer for viewing by a user. In a preferred embodiment, the expression of age in an alternate base notation, as it is produced for perception by a person by output expression of age in alternate base notation step 130, uses only the symbols "0", "1", "2", "3", "4", "5", "6", "7", "8", and "9".

Figure 2:
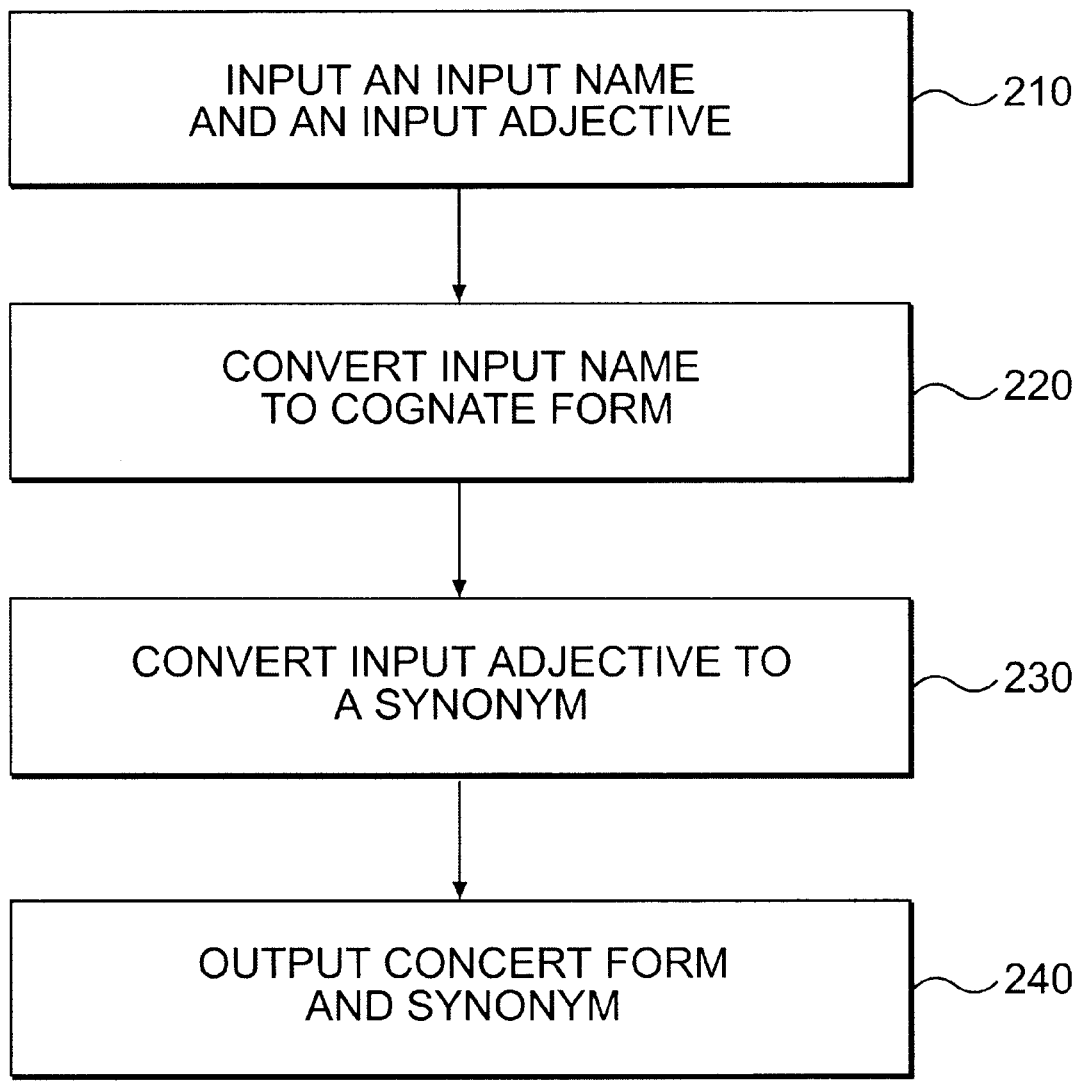
FIG. 2 is a flow chart depicting a preferred embodiment of a method for symbol manipulation in an electronic data processing system of the preferred invention, relating to the representation of names.

FIG. 2 depicts a flow chart of a preferred embodiment of a method for symbol manipulation in an electronic data processing system relating to the representation of names. The method includes the steps of inputting an input name and an input adjective; converting the input name to a cognate form; converting the input adjective to a synonym; and outputting the cognate form and the synonym. In a preferred embodiment, the electronic data processing system is the Internet communications network including computer systems attached thereto. In alternative preferred embodiments, the electronic data processing system may be a personal computer, a communications network including the computer systems attached thereto, or other electronic data systems as are known in the art.

In the preferred embodiment depicted in FIG. 2, the inputting an input name and an input adjective step is accomplished by input an input name and an input adjective step 210. In preferred embodiments, various input mechanisms as are known in the art, such as computer keyboards, electronic mice, and touchscreens, may be employed by a user for inputting into an electronic data processing system the name and adjective information required by input an input name and an input adjective step 210. In a preferred embodiment, the electronic data processing system is the Internet communications network including computer systems attached thereto. In this preferred embodiment, information is, for example, input by a user at a home personal computer and is transmitted via World Wide Web protocols across the Internet to a web server where other steps of the method of the present invention may be performed. Other configurations and architectures of electronic data processing systems, as are known in the art, may be used.

In the preferred embodiment depicted in FIG. 2, the converting the input name to a cognate form step is accomplished by convert input name to cognate form step 220. Techniques for using electronic data processing systems to convert between an expression of a name and other forms of expression of a name are known in the art. In a preferred embodiment, this step is performed by a digital computer that forms a part of an electronic data processing system. In alternative preferred embodiments, this step may be performed by networked computers, analog computers or other computing systems as are known in the art that form portions of an electronic data processing system.

In a preferred embodiment of convert input name to cognate form step 220, the input name is compared to a list of prespecified names which are stored in a table within the electronic data processing system as is known in the art. In this preferred embodiment, one or more cognate forms of each prespecified name is stored in the table in association with that prespecified name. If the input name matches one of the prespecified names, then the input name is converted to one of the cognate forms associated with that prespecified name. In a preferred embodiment, if the input name matches one of the prespecified names and if that prespecified name is associated with a plurality of cognate forms, then one of the plurality of cognate forms is selected at random, as is known in the art, and the input name is converted to the selected cognate form. In a preferred embodiment, if the input name does not match any of the prespecified names, then the cognate form of the input name is considered to be the input name and the conversion process leaves the input name unchanged. In a preferred embodiment, cognate forms are chosen to represent a particular culture such as, for example and without limitation, the Viking culture.

In the preferred embodiment depicted in FIG. 2, the converting the input adjective to a synonym step is accomplished by convert input adjective to synonym step 230. Techniques for using electronic data processing systems to convert between an expression of an adjective, on the one hand, and synonyms of that adjective, on the other hand, are known in the art. In a preferred embodiment, this step is performed by a digital computer that forms a part of an electronic data processing system. In alternative preferred embodiments, this step may be performed by networked computers, analog computers or other computing systems as are known in the art that form portions of an electronic data processing system.

In a preferred embodiment of convert input adjective to synonym step 230, the input adjective is compared to a list of prespecified adjectives which are stored in a table within the electronic data processing system as is known in the art. In this preferred embodiment, one or more synonyms of each prespecified adjective is stored in the table in association with that prespecified adjective. If the input adjective matches one of the prespecified adjectives, then the input name is converted to one of the synonyms associated with that prespecified adjective. In a preferred embodiment, if the input adjective matches one of the prespecified adjectives and if that prespecified adjective is associated with a plurality of synonyms, then one of the plurality of synonyms is selected at random, as is known in the art, and the input adjective is converted to the selected synonym. In a preferred embodiment, if the input adjective does not match any of the prespecified adjectives then the synonym of the input adjective is considered to be the input adjective and the conversion process leaves the input adjective unchanged. In a preferred embodiment, synonyms are chosen to represent a particular culture such as, for example and without limitation, the Viking culture.

In the preferred embodiment depicted in FIG. 2, the outputting the cognate form and synonym step is accomplished by output cognate form and synonym step 240. In preferred embodiments, various output mechanisms as are known in the art, such as cathode-ray tube displays and printers, may be employed for outputting the cognate form and synonym information required by output cognate form and synonym step 240 by an electronic data processing system. In a preferred embodiment, the electronic data processing system is the Internet communications network including computer systems attached thereto. In this preferred embodiment, information is, for example, transmitted from a web server across the Internet via World Wide Web protocols to a home personal computer for viewing by a user.

To illustrate by way of example the preferred embodiment depicted in FIG. 2, a user may input the input name "John" and the input adjective "excitable." In keeping with the Viking culture, "John" is converted to the Viking cognate form "Jens" and "excitable" is converted to the Viking synonym "Berserk." These results are output to the user as "Jens the Berserk."

Figure 3:
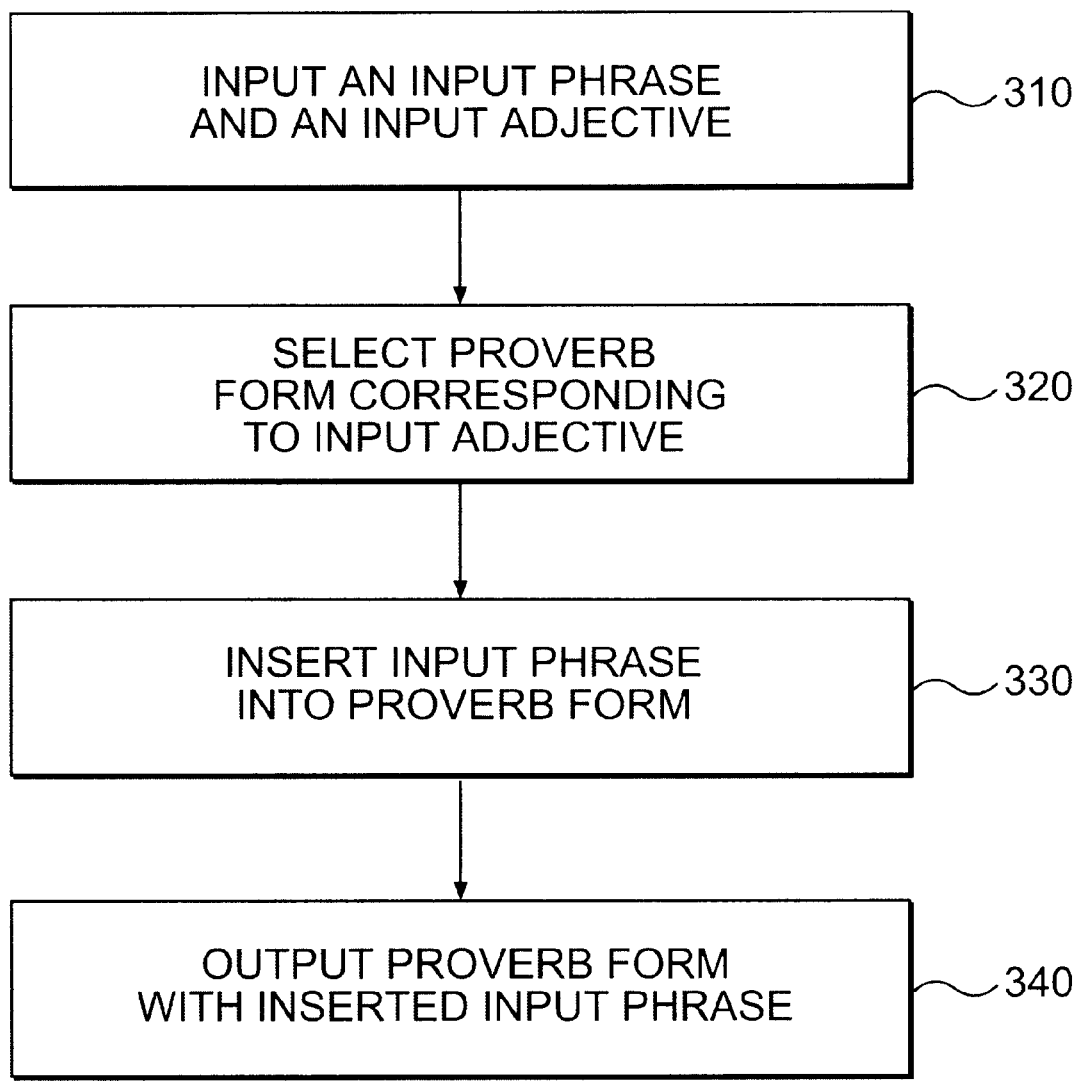
FIG. 3 is a flow chart depicting a preferred embodiment of a method for symbol manipulation in an electronic data processing system of the preferred invention, relating to the construction of proverbs.

FIG. 3 depicts a flow chart of a preferred embodiment of a method for symbol manipulation in an electronic data processing system relating to the construction of proverbs. The method includes the steps, using an electronic data processing system, of inputting an input phrase and an input adjective; selecting a proverb form corresponding to the input adjective; inserting the input phrase into the proverb form; and outputting the proverb form with the inserted input phrase. In a preferred embodiment, the electronic data processing system is the Internet communications network including computer systems attached thereto. In alternative preferred embodiments, the electronic data processing system may be a personal computer, a communications network including the computer systems attached thereto, or other electronic data systems as are known in the art.

In the preferred embodiment depicted in FIG. 3, the inputting an input phrase and an input adjective step is accomplished by input an input phrase and an input adjective step 310. In preferred embodiments, various input mechanisms as are known in the art, such as computer keyboards, electronic mice, and touchscreens, may be employed by a user for inputting the phrase and adjective information required by input an input phrase and an input adjective step 310 into an electronic data processing system. In a preferred embodiment, the electronic data processing system is the Internet communications network including computer systems attached thereto. In this preferred embodiment, information is, for example, input by a user at a home personal computer and is transmitted via World Wide Web protocols across the Internet to a web server where other steps of the method of the present invention may be performed. Other configurations and architectures of electronic data processing systems, as are known in the art, may be used.

In the preferred embodiment depicted in FIG. 3, the selecting a proverb form corresponding to the input adjective step is accomplished by select proverb form corresponding to input adjective step 320. Techniques for using electronic data processing systems to select textual forms such as proverb forms based on input text such as an input adjective are known in the art. In a preferred embodiment, this step is performed by a digital computer that forms a part of an electronic data processing system. In alternative preferred embodiments, this step may be performed by networked computers, analog computers or other computing systems as are known in the art that form portions of an electronic data processing system.

In a preferred embodiment of select proverb form corresponding to input adjective step 320, the input adjective is compared to a list of prespecified adjectives which are stored in a table within the electronic data processing system as is known in the art. In this preferred embodiment, one or more proverb forms corresponding to each prespecified adjective is stored in association with that prespecified adjective. If the input adjective matches one of the prespecified adjectives, then one of the proverb forms associated with that prespecified adjective is selected. In a preferred embodiment, if the input adjective matches one of the prespecified adjectives and if that prespecified adjective is associated with a plurality of proverb forms, then one of the plurality of proverb forms is selected at random, as is known in the art. In a preferred embodiment, if the input adjective does not match any of the prespecified adjectives then the user is requested, as is known in the art, to input a different input adjective. In alternate preferred embodiment, if the input adjective does not match any of the prespecified adjectives then a default proverb form is selected, as is known in the art.

In the preferred embodiment depicted in FIG. 3, the inserting the input phrase into the proverb form step is accomplished by insert input phrase into proverb form step 330. Techniques for inserting textual material, such as the input phrase, into textual forms, such as the selected proverb form, are known in the art. In a preferred embodiment, this step is performed by a digital computer that forms a part of an electronic data processing system. In alternative preferred embodiments, this step may be performed by networked computers, analog computers or other computing systems as are known in the art that form portions of an electronic data processing system.

In the preferred embodiment depicted in FIG. 3, the step of outputting the proverb form with the inserted input phrase is accomplished by output proverb form with inserted input phrase step 340. In preferred embodiments, various output mechanisms as are known in the art, such as cathode-ray tube displays and printers, may be employed for outputting the proverb information required by output proverb form with inserted input phrase step 340 by an electronic data processing system. In a preferred embodiment, the electronic data processing system is the Internet communications network including computer systems attached thereto. In this preferred embodiment, information is, for example transmitted from a web server across the Internet via World Wide Web protocols to a home personal computer for viewing by a user.

To illustrate by way of example the preferred embodiment depicted in FIG. 3, a user may input the input phrase "Web sites" and the input adjective "annoying." The adjective "annoying" had previously been associated with the proverb form "Avoid xxx and hungry flies," and, thus, the input adjective is matched with the adjective "annoying" and this proverb form is selected. Note that "xxx" is a placeholder, as is known in the art, which indicates where text may be inserted. The input phrase "Web sites" is inserted in place of the "xxx" placeholder into the proverb form "Avoid xxx and hungry flies." The proverb form with the inserted input phrase, "Avoid Web sites and hungry flies," is then output to the user.

It will be apparent to those skilled in the art that various modifications can be made to this invention of a method for symbol manipulation in an electronic data processing system, without departing from the scope or spirit of the invention or of the claims. It is also intended that the present invention and appended claims cover modifications, variations and equivalents of the method for symbol manipulation in an electronic data processing system of the present invention.

I claim:

1. A method for symbol manipulation in an electronic data processing system, comprising the steps of:

inputting a first expression of age in base 10 notation;

converting the first expression of age to a second expression of age in an alternate base notation; and outputting the second expression of age, wherein the step of outputting the second expression of age uses only the symbols "0", "1", "2", "3", "4", "5", "6", "7", "8", and "9."

2. The method for symbol manipulation in an electronic data processing system of claim 1, wherein the second expression of age, when interpreted as a third expression of age in base 10 notation, is greater than the first expression of age.

3. The method for symbol manipulation in an electronic data processing system of claim 1, wherein the expression of age, when interpreted as a third expression of age in base 10 notation, is less than the first expression of age.

4. A method for symbol manipulation in an electronic data processing system, comprising the steps of:

inputting an input name and an input adjective;

converting the input name to a cognate form;

converting the input adjective to a synonym; and outputting the cognate form and the synonym.

5. The method for symbol manipulation in an electronic data processing system of claim 4 wherein the step of converting the input name to a cognate form comprises the step of designating, if the input name does not match any prespecified name on a list of prespecified names, the cognate form of the input name to be the input name.

6. The method for symbol manipulation in an electronic data processing system of claim 4 wherein the step of converting the input name to a cognate form comprises the step of designating, if the input name matches a prespecified name on a list of prespecified names, the cognate form of the input name to be a randomly selected cognate form that is associated with the matching prespecified name.

7. The method for symbol manipulation in an electronic data processing system of claim 4 wherein the step of converting the input adjective to a synonym comprises the step of designating, if the input adjective does not match any prespecified adjective on a list of prespecified adjectives, the synonym of the input adjective to be the input adjective.

8. The method for symbol manipulation in an electronic data processing system of claim 4 wherein the step of converting the input adjective to a synonym comprises the step of designating, if the input adjective matches a prespecified adjective on a list of prespecified adjectives, the synonym of the input adjective to be a randomly selected synonym that is associated with the matching prespecified adjective.

9. A method for symbol manipulation in an electronic data processing system, comprising the steps of:

inputting an input phrase and an input adjective;

selecting a proverb form corresponding to the input adjective;

inserting the input phrase into the proverb form; and outputting the proverb form with the inserted input phrase.

10. The method for symbol manipulation in an electronic data processing system of claim 9 wherein the step of selecting a proverb form corresponding to the input adjective comprises the step of randomly selecting the proverb form from a set of proverb forms that are associated with a prespecified adjective that matches the input adjective.

* * * * *